United States Patent
Fabros (10) Patent No.: US 9,279,399 B2
(45) Date of Patent: Mar. 8, 2016

(54) AIR TRAP VARIABLE MANIFOLD RUNNERS

(71) Applicant: Ford Global Technologies, LLC, Dearborn, MI (US)

(72) Inventor: Charles Fabros, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 495 days.

(21) Appl. No.: 13/773,394

(22) Filed: Feb. 21, 2013

(65) Prior Publication Data

US 2014/0230782 A1   Aug. 21, 2014

(51) Int. Cl.
*F02M 35/10*   (2006.01)
*F02M 35/104*   (2006.01)
*F02B 27/02*   (2006.01)

(52) U.S. Cl.
CPC .......... *F02M 35/104* (2013.01); *F02B 27/0236* (2013.01); *F02M 35/10072* (2013.01); *F02M 35/10137* (2013.01); *F02M 35/10301* (2013.01); *F02M 35/10334* (2013.01); *Y02T 10/146* (2013.01)

(58) Field of Classification Search
CPC ................. F02M 35/10072; F02M 35/10137; F02M 35/10301; F16L 11/08; F16L 11/085; F16L 11/088; F16L 27/1004; F02B 27/0231; F02B 27/036
USPC .............. 123/184.51, 184.53, 184.55, 184.56
See application file for complete search history.

(56) References Cited

U.S. PATENT DOCUMENTS

| 4,150,961 | A | * | 4/1979 | Atkins ..................... 55/385.1 |
| 4,210,107 | A |   | 7/1980 | Shaffer |
| 4,590,895 | A | * | 5/1986 | Yada et al. .............. 123/184.55 |
| 5,687,684 | A |   | 11/1997 | Verkleeren |
| 5,762,036 | A |   | 6/1998 | Verkleeren |
| 5,806,899 | A | * | 9/1998 | Norikawa et al. ............. 285/299 |
| 6,220,023 | B1 | * | 4/2001 | Ezzeddini et al. ............. 60/322 |
| 6,460,501 | B1 | * | 10/2002 | Fischer et al. ........... 123/184.55 |
| 6,901,898 | B1 |   | 6/2005 | Oberg et al. |
| 6,983,727 | B2 |   | 1/2006 | Narayanaswamy |
| 8,220,498 | B2 | * | 7/2012 | Van Hooren et al. ......... 138/126 |
| 8,382,165 | B2 | * | 2/2013 | Stalcup et al. ................ 285/226 |
| 2009/0266328 | A1 |   | 10/2009 | Bong et al. |

OTHER PUBLICATIONS

Medica, Vladimir et al., "Control Strategy for Continuously Variable Pipes Length of the Intake Manifold," F2000A095, Seoul 2000 FISITIA World Automotive Congress, Jun. 12-15, 2000, Seoul, Korea, 8 pages.

* cited by examiner

*Primary Examiner* — Lindsay Low
*Assistant Examiner* — Robert Werner
(74) *Attorney, Agent, or Firm* — Julia Voutyras; Alleman Hall McCoy Russell & Tuttle LLP (57) ABSTRACT

A system and method for controlling the flow of air to an intake port of an engine is described that includes a flexible intake manifold runner comprised of helically wound braids. In one example, the length and cross-sectional area are mechanically interlinked. In this way, the flexible intake manifold runner can be tuned over a wider operating band while maintaining a lower cost design.

20 Claims, 7 Drawing Sheets

AIR TRAP VARIABLE MANIFOLD RUNNERS

FIELD

The present description relates to a system and method for controlling a flow of air to intake ports of an engine.

BACKGROUND AND SUMMARY

Intake manifold runners include pipes designed to deliver a flow of air to combustion chambers within an engine. However, during certain parts of the engine drive cycle, intake valves are closed and prevent the air from flowing. When one or more intake valves open, a pressure wave develops within the runner and may increase the amount of air entering the open cylinder chamber. Therefore, under some operating conditions (e.g. at certain RPMs), the time when the propagating pressure wave encroaches upon the intake valve may align with intake valve opening, which causes a significant improvement in the volumetric efficiency and thereby the performance of the engine. For this reason, the airflow may depend on the geometry of a runner. For instance, the time for a pressure wave to propagate through a long manifold runner and back to an intake valve is longer compared to the length of time in a short manifold runner. As such, an engine with longer runners may have a torque peak at a lower RPM range than an engine with short intake runners, which may instead have a power peak at a higher RPM.

In an attempt to accommodate a range of engine conditions, intake manifolds with variable length runners spread out the torque curve into a broad, more manageable profile. Previous variable runner length designs may include continuously variable and discretely variable lengths. Continuously variable intake manifold runners vary the length of a runner with no substantial change to the runner shape or cross-sectional area. Because of the constant cross-sectional area, under some engine conditions, the variable length runner may degrade torque output and thereby decrease fuel efficiency. On the other hand, discretely variable runners typically have preset long and short runner configurations and so often have a pronounced valley of low torque output. An example intake manifold system with continuously variable runners that couple a change in length to a change in cross-sectional area is shown in U.S. Pat. No. 5,687,684 and U.S. Pat. No. 5,762,036. However, the manifold assembly described therein includes parts with intricate groove-like features and non-symmetrical shapes that may be fabricated by a time consuming injection mold process.

The inventor has recognized the disadvantages of the approaches described above and herein discloses a manifold assembly encased in a plenum chamber that includes flexible intake manifold runners coupled to an actuator shaft on one end and to an intake port of an engine on the other end. The flexible manifold runner may be comprised of a helically braided tube. This design allows for a continuously variable runner length, cross-sectional area and tube shape with reduced artificial obstructions to the flow of air to an intake port.

The present description may provide several advantages. In particular, extension of a biaxially braided tube causes a decrease in the cross-sectional area, with the reverse occurring as the tube is compressed. Therefore, an intake manifold runner can be tuned over a wide operating band from low RPM torque to high RPM power in a manner that depends on the operating conditions of the engine. As such, the method allows a cost-effective measure to control the flow of air to the engine based on engine speed and load. Furthermore, because the change of runner length can be calibrated to the change in cross-sectional area, the method may be implemented in various engine systems for optimal engine performance based on the speed and load on the engine, which thereby increases fuel efficiency.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
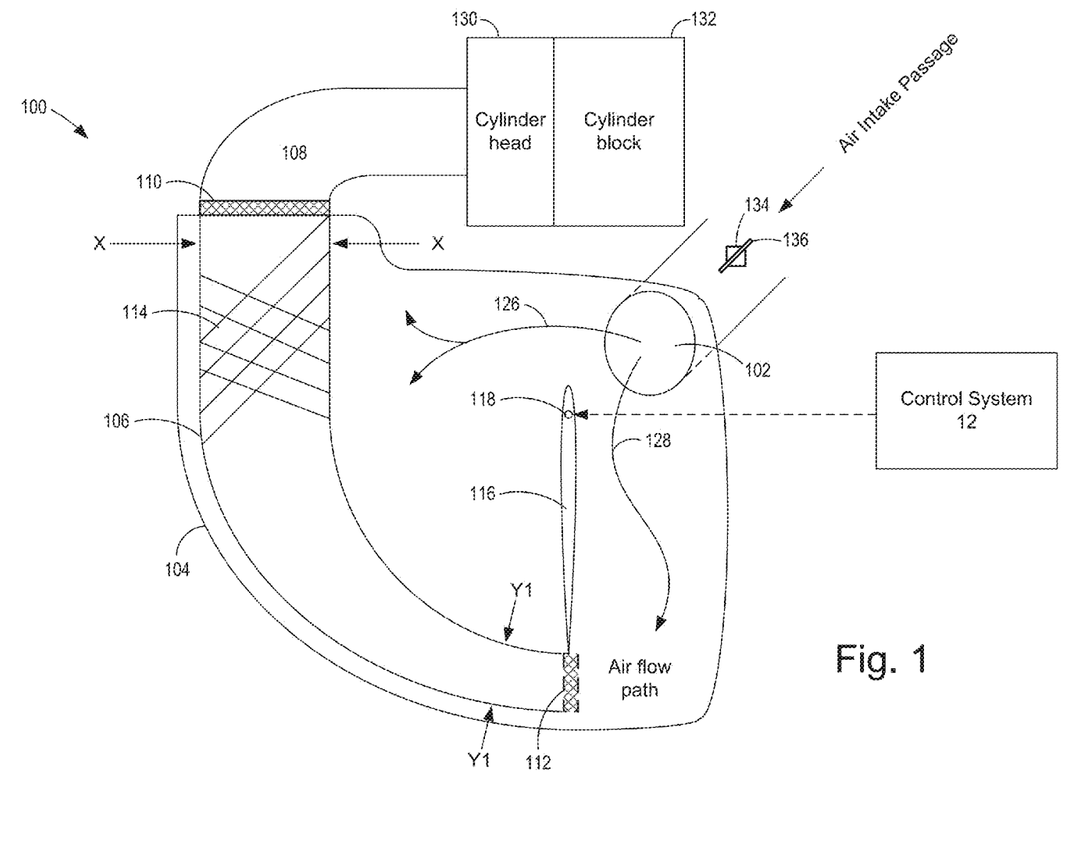
FIG. 1 shows a schematic vertical cross-section through an example plenum with a flexible intake runner in the long configuration.
Figure 2:
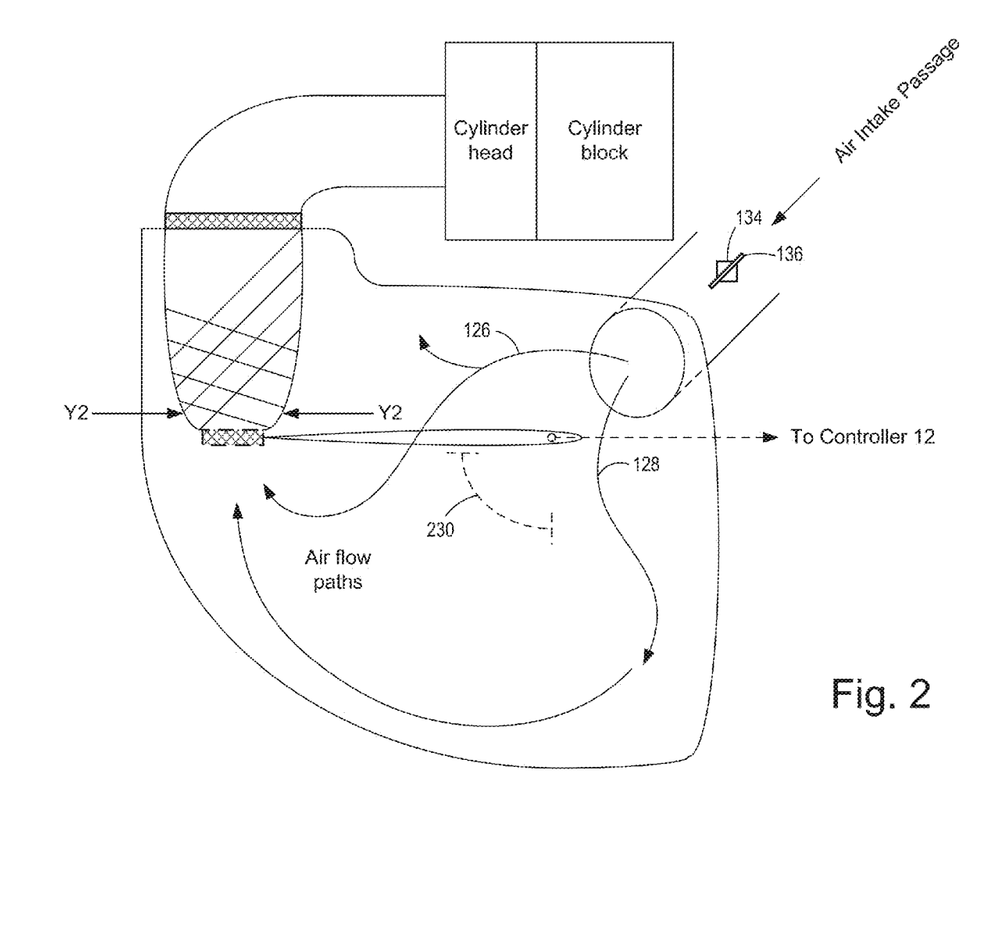
FIG. 2 shows a schematic vertical cross-section through an example plenum with a flexible intake runner in the short configuration.
Figure 3:
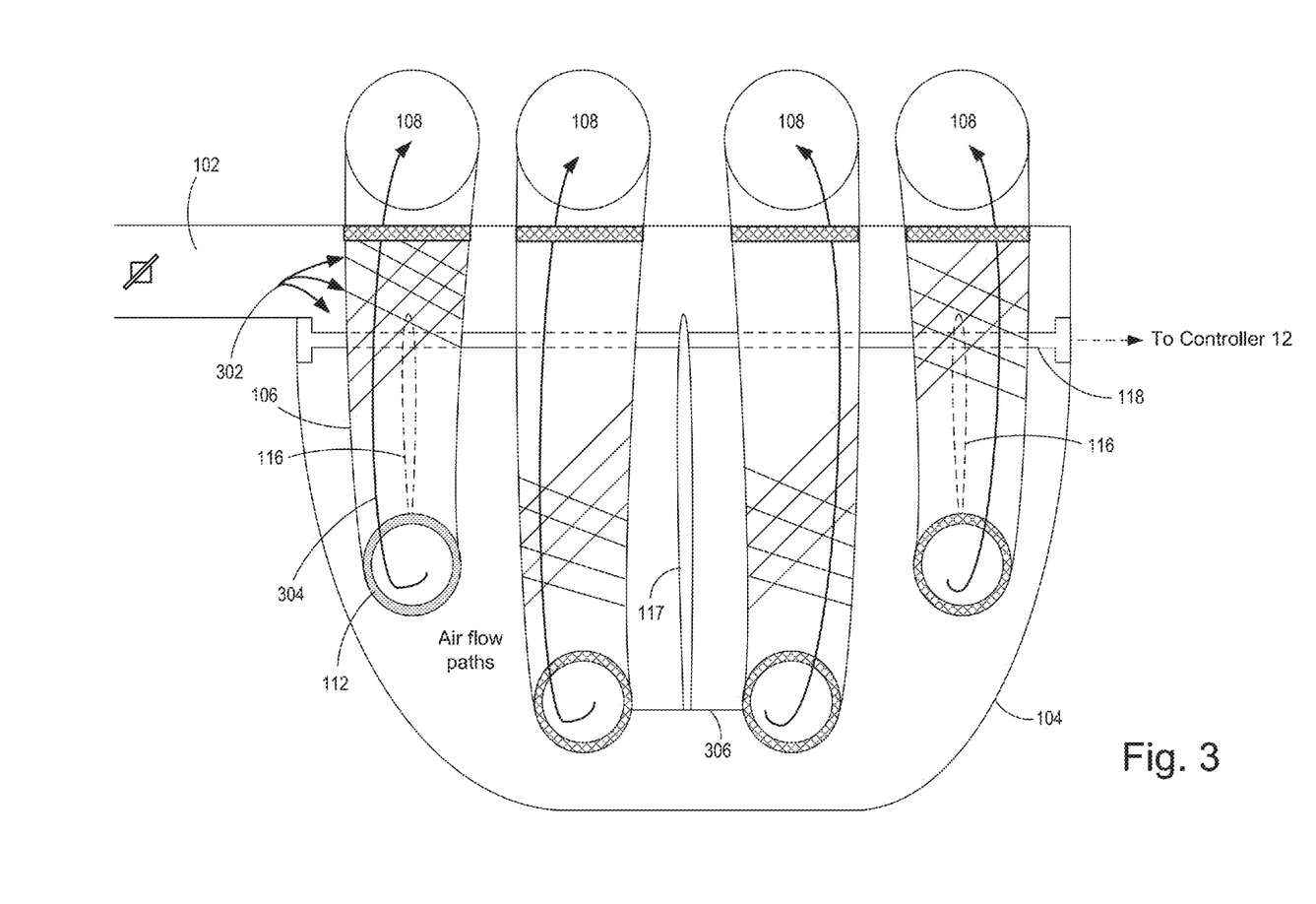
FIG. 3 is a side view of an example engine block with flexible intake runners in the long configuration.
Figure 4:
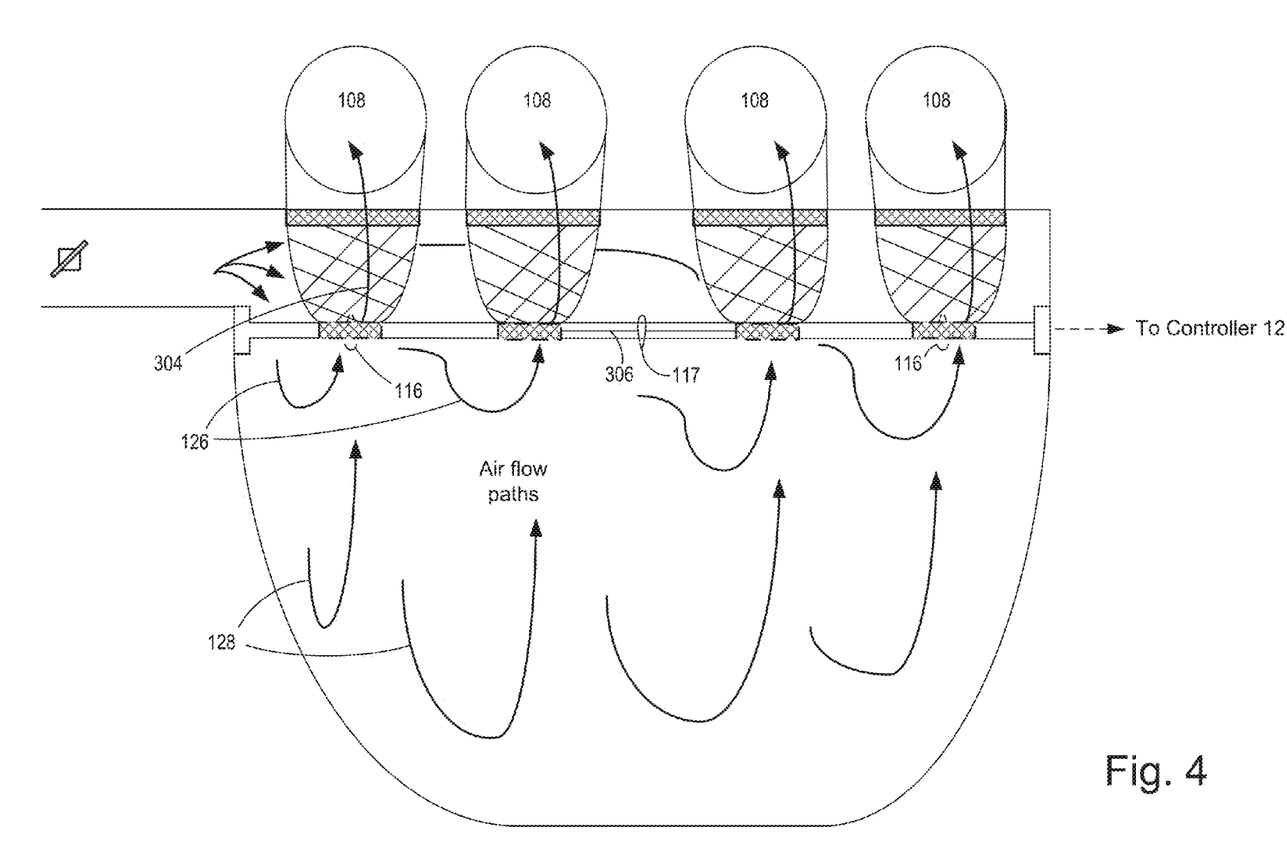
FIG. 4 is a side view of an example engine block with flexible intake runners in the short configuration.
Figure 5:
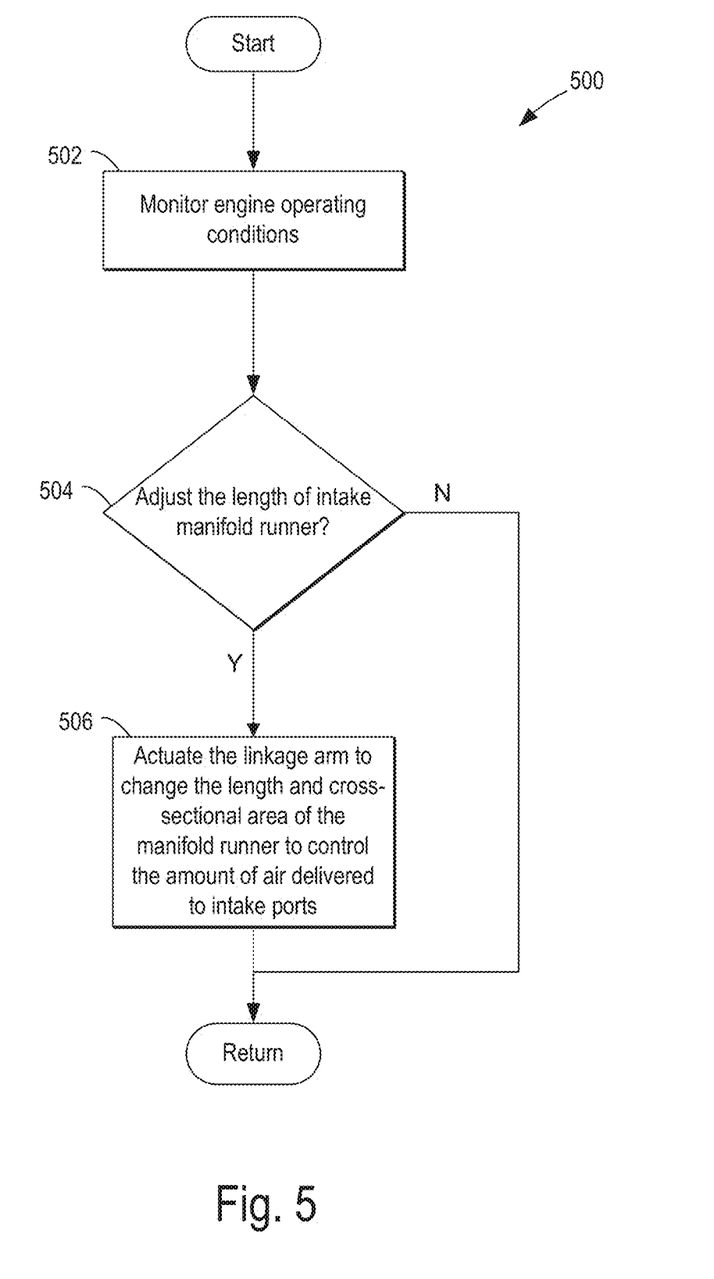
FIG. 5 is a flow chart illustrating a method for controlling the flow of air to intake ports of an engine.
Figure 6A:
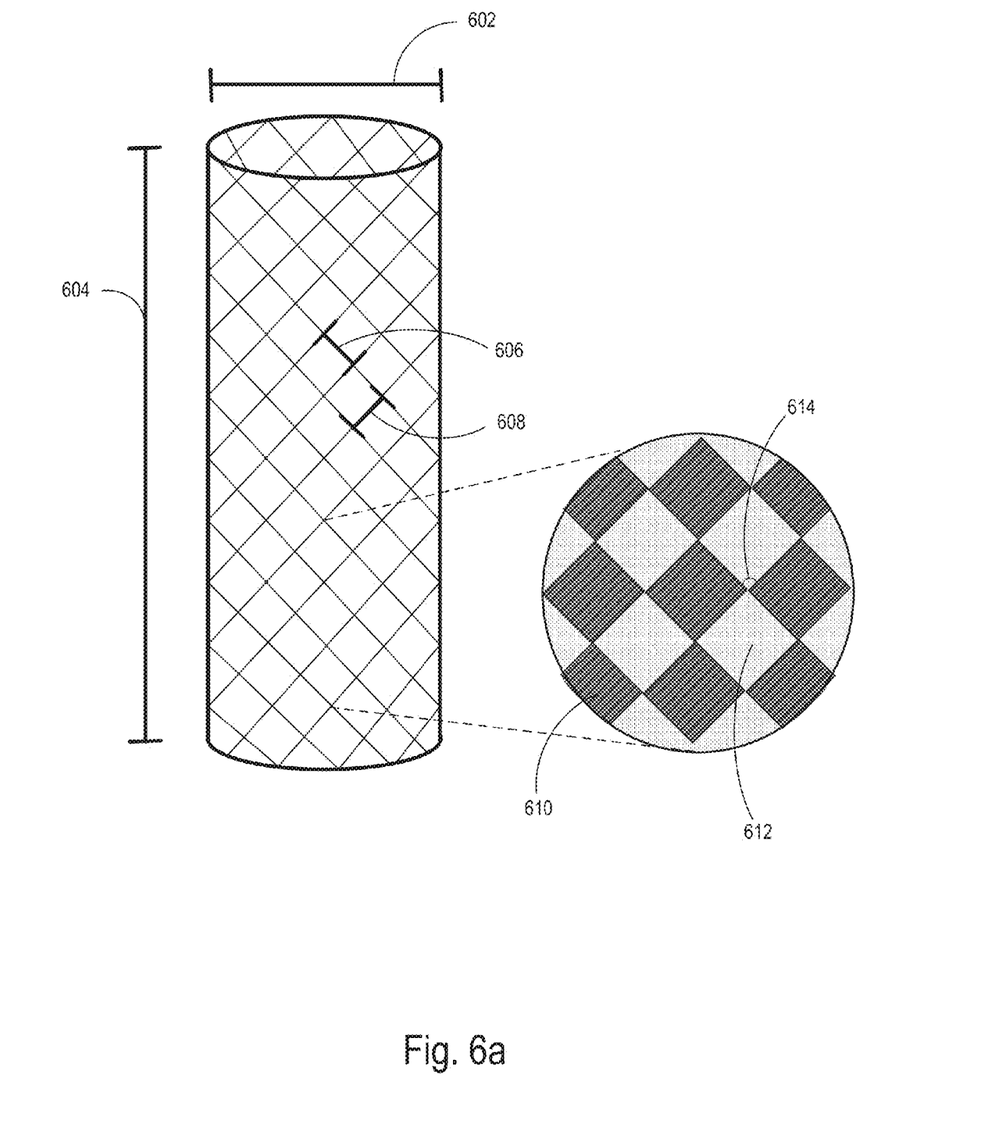
FIG. 6a is a schematic diagram of an example flexible intake runner with a cylindrical tube shape.
Figure 6B:
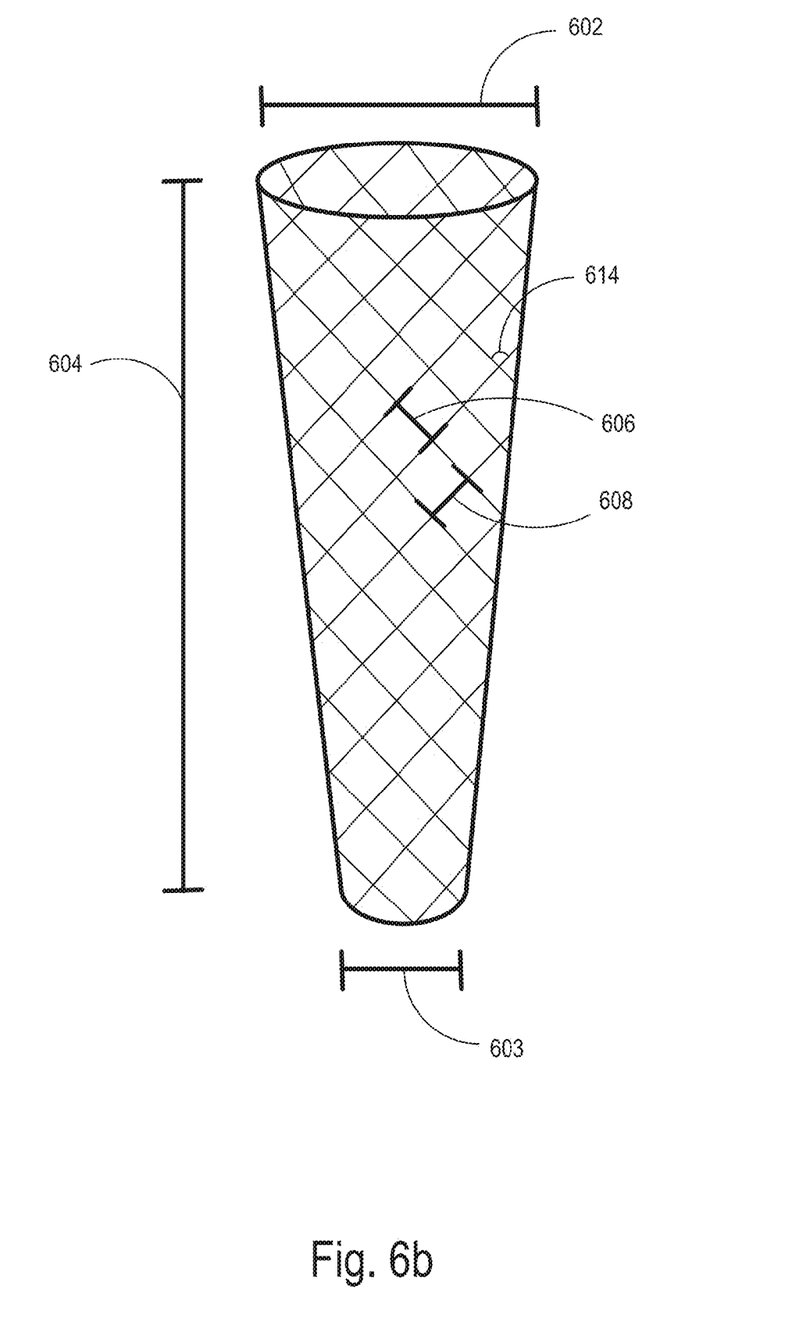
FIG. 6b is a schematic diagram of an example flexible intake runner with a conical tube shape.

The present description relates to a system and method for controlling the flow of air to intake ports of an engine. The method involves adjusting the length of flexible intake manifold runners comprised of helically wound braids in a manner that also changes the cross-sectional area. In FIGS. 1 and 2, exemplary long and short curved runners are shown to illustrate how air flows through the plenum assembly of the engine in each configuration. Then, FIGS. 3 and 4 show side view schematic diagrams of an example I4 engine block with multiple braided runners in the long and short configurations, respectively, to illustrate how linkage arms connected to the braided runners operate as a unit when adjusting the length of the runners. Because runner length is continuously variable, the flow chart of FIG. 5 describes a method for adjusting the runner length based on the engine operating conditions in a manner that also changes the cross-sectional area, which allow for the flow of air delivered to the engine to be adjusted. With respect to the runner shape, FIGS. 6a and 6b illustrate how the runner tube shape may be adjusting by changing structural elements of the helical braids, which thereby allows a flow of air through each runner to be calibrated in the manner described herein.

Referring now to FIGS. 1 and 2, engine system 100 contains cylinder block 132. The cylinder block and cylinder head 130 form a unit comprising at least one cylinder, including cylinder walls, combustion chambers, piston heads connected to a crankshaft, and poppet valves connected to a camshaft. It will be appreciated that the configurations and methods disclosed herein are exemplary in nature, and that these specific embodiments are not to be considered in a limiting sense, because numerous variations are possible. For example, the above technology can be applied to V-6, V-8, V-12, I-6, opposed 4, and other engine types.

FIGS. 1 and 2 show schematic diagrams of example vertical cross-sections through plenum 104 of engine 100 to illustrate how actuator linkage arm 116 couples rotatable actuator shaft 118 to a flexible intake manifold runner 106. Because each flexible runner tube is comprised of interwoven helical braids, the manifold assembly system allows for the length and cross-sectional areas of the tube to coupled, wherein extension of the biaxially braided tube causes a decrease in the cross-sectional area, and compression of the braided tube causes an increase in the cross-sectional area. This design allows for a continuously variable runner length, cross-sectional area and tube shape with no artificial obstructions to the airflow.

In FIG. 1, intake manifold runner 106 is shown in the long configuration, wherein the runner may be at its longest length. Within plenum 104, which is an enclosed, sealed space to contain air before delivering it to a combustion chamber within the engine block, manifold runner 106 is shown coupled to intake manifold 108 through a solid stationary ring 110. Therein, one end of the flexible intake runner is fixed at an outlet of a manifold plenum (e.g. via a manifold flange), and an opposite end of the flexible intake runner is moveable within the plenum while being spaced away from all inlets and outlets of the plenum. In the example figure, the second end of manifold runner 106, which is uncoupled from intake manifold 108 and an intake manifold opening is shown coupled to actuator linkage arm 116 through a hard adjustable ring 112. As such, the second end is moveable within the plenum cavity. In one embodiment, the hard adjustable ring 112 may further have an airhorn shape to minimize flow loss. Combustion chambers within cylinder head 130 and cylinder block 132 can receive intake air via intake manifold 108. Furthermore, each intake runner may selectively communicate with a corresponding cylinder via one or more intake valves of that cylinder. In some embodiments, one or more of the intake passages may include a boosting device such as a turbocharger or a supercharger.

Generally, air enters plenum 104 through air intake passage 102 and fills the chamber. In some embodiments, a throttle 134 including a throttle valve 136 may be provided along an intake passage of the engine for varying the flow rate and/or pressure of intake air provided to the engine cylinders. When manifold runner 106 is in the long configuration, as air fills plenum 104, at least some of the air flow may be directed into flexible intake manifold runner. For this reason, a first air flow 128 is shown in the figure. Conversely, a second air flow path 126 is also shown but is not directed toward the long flexible runner. Rather, this secondary air flow fills the plenum chamber first, and then enters the runner second, for instance, if an intake valve is held open for a length of time that allows substantially all of the air in plenum 104 to be delivered to the cylinder.

To demonstrate the difference in air flow when the intake manifold runner 106 is in the short configuration, FIG. 2 shows actuator linkage arm 116 rotated by angle 230 (e.g. 90°). Therein, the curved path followed by actuator linkage arm 116, and therefore adjustable ring 112, is also represented by angle 230. Furthermore, because the cross-sectional area increases as flexible intake manifold runner 106 is compressed, the diameter of the tube near adjustable ring 112 is shown larger compared to the same element shown in FIG. 1. That is, diameter Y2-Y2 is greater than diameter Y1-Y1 from FIG. 1. When the flexible manifold runners are in the short configuration, as air enters the plenum chamber, it fills the plenum in a similar manner as described with respect to FIG. 1. However, the first air flow 128 and the second air flow 126 may both be directed into the intake manifold runner, which thereby allows the power generated to be increased when the load on the engine is high, for example, when engine RPMs are greater than 5000.

Turning now to the structure of intake manifold runner 106, the flexible runners are comprised of helically wound braids 114 that are shown schematically in FIGS. 1-4, but described in more detail below. Inclusion of the interwoven braids allows the diameter, or cross-sectional area of the tube, to be changed when the length of the tube is changed, which is adjustable via movement of the linkage arm. Therefore, the two parameters are coupled such that a change in the tube length causes a change in the cross-sectional area. This design is commonly known as a finger-trap. The helically wound braids 114 may be comprised of strands of a composite spring material, such as a carbon fiber film, fiberglass, wicker fibers or fabric. Furthermore, changing various elements of the composite spring strands allows the overall shape of the tube to be adjusted, which further enables tuning of an intake manifold runner based on the engine speed and load. For example, a cylindrical braided runner may have composite spring strands with a substantially constant width that allows uniform adjustment of the tube cross-section along the entire length of the tube. Conversely, a conical braided runner may include composite spring strands with a variable width that allows a variable taper from one end to the other and a varying cross-section of the tube along its length. Because stationary ring 110 and adjustable ring 112 are shown having different diameters, or sizes, in the example configurations shown, the braided runner has a conical shape. Therefore, the cross-section on one side of the tube (e.g. near stationary ring 110) is larger than the cross-section on the other side (e.g. near adjustable ring 112). For example, in FIG. 1, the distance X-X, which represents the diameter of the tube near stationary ring 110 is larger than the distance Y1-Y1 that represents the diameter of the tube near adjustable ring 112. When the diameters of the tube are different at each end, the shape of the tube is conical. To substantially eliminate any air from leaking between the individual woven strands, the braided flexible tubes may be further encased in a flexible polymer membrane such as a balloon. In some instances, the flexible polymer membrane may be applied in a liquid form to the woven structure and then allowed to solidify, but in other instances, a pre-formed membrane may be applied to the either the outer or inner diameter of the woven flexible tubes during the manufacturing process.

In some embodiments, actuation of a curved runner may use a rotary actuator. Therefore, actuator linkage arm 116 is shown coupled to a hard adjustable ring 112 on a first end, and to actuator shaft 118 on a second end. Therefore, engine 100 may also include control system 12 coupled to actuator shaft 118, which may adjust the length of the braided runner by rotating actuator shaft 118 around a longitudinal axis based on the engine operating conditions. Because the braided runner is coupled to a rotary actuator, the motion of actuator linkage arm 116 may scribe an arc or curved path along which the curved, braided runner is designed to follow. In some embodiments, the path scribed by a linkage arm may not be curved but instead may be substantially linear. When this is the case, actuation may be provided by a linear actuator instead of a rotary actuator. In other embodiments, the path may be a combination of straight and curved based on different types of actuators and linkages having various motion ratios and paths of motion.

Although a long and a short configuration are shown in FIGS. 1 and 2, control system 12 may continuously adjust the position of adjustable ring 112 simply by rotating actuation shaft 118 around an axis with the linkage arm coupled thereto. As such, adjustable ring 112 may be stopped at any point along its path in a manner that allows continuous position adjustment. Then, based on the geometric characteristics of tube, the air delivered to intake ports of the engine can be calibrated for optimal delivery based on the speed and load on the engine.

With regard to modulation of runner length when multiple runners are present, FIGS. 3 and 4 show schematic side view diagrams of an example I4 engine block that includes actuator shaft 118 coupled to shorter actuator linkage arms 116 and a longer central actuator linkage arm 117. Because all three linkage arms are coupled to actuator shaft 118, control system 12 may change the runner length simply by rotating actuator shaft 118 around an axis. Therefore, in some embodiments, the actuator shaft and linkage arms coupled to flexible runner tubes form a structure that operates as a unit. While adjustment of runner length is described in terms of a structural unit in this example embodiment, in some embodiments, the length of each runner may not be adjusted synchronously but may instead be adjusted independently in a manner that depends on the engine operating conditions. For instance, the movement of individual runners may be designed for optimal engine tuning based on the packing space available in the engine compartment, or on a set of desired engine torque curve characteristics. In still other embodiments, the movement of the arms may be non-uniform but still be adjusted in a manner that depends on the operating conditions of the engine.

In FIGS. 3 and 4, air flows into plenum 104 through air intake passage 102 as described with respect to FIGS. 1 and 2. However, in this example, as the flow of air enters the chamber, it may branch into multiple air paths 302 and begin to fill the chamber. As described above, each of these air paths may be comprised of a first and second air flow path as shown in FIG. 1. Although the pathways are represented by substantially straight arrows in the figures, in some instances, the air paths may form eddies or swirl as they fill the plenum chamber and so not flow directly into the runners. For example, when the intake ports are closed, air entering plenum 104 may fill the chamber but not flow to the intake ports until the pressure differential corresponding to intake valve opening occurs. With the runners in the long configuration, as air flows into the plenum at least some air may enter the flexible runners through adjustable rings 112. For example, as air flows into the chamber, an airflow path may develop that is directed downward through plenum 104 toward adjustable ring 112 in a manner similar to the first air flow 128 shown in FIG. 1. This airflow may enter manifold runner 106 as it continues on toward intake manifold 108. Arrows 304 shown therein represent the direction of flow through the braided runners.

In FIG. 3, actuator shaft 118 is shown connected to three linkage arms. However, in some embodiments, a different number of linkage arms may be present. Because the two outside intake manifold runners are shorter than the two central runners, two different types of linkage arms are present. In the example shown, the short linkage arms 116 are coupled to adjustable rings 112 as indicated in FIG. 1. For example, in some embodiments, coupling of linkage arms 116 to adjustable rings 112 may comprise a simple hook and eye closure while in other embodiments, the two metal parts may be attached in a more permanent bonded manner, for example, by adhering the linkage arms directly to the adjustable rings. Generally, a single or multi-bar linkage may be used independently or in combination with other linkages depending on the desired movement path of a runner, which may be a straight line, a circular or curved arc, or a combination of straight and curved paths. With regard to the central linkage arm 117, which changes the length of the two longer braided runners by rotating actuator shaft 118, the linkage arm is shown coupled to connecting part 306 that connects the linkage arm to the adjustable rings of the longer braided runners. In some embodiments, connector part 306 may be a rod that connects the two central adjustable rings while central linkage arm 117 is comprised of a hook on one end to couple the linkage arm to the rod. Therefore, when actuator shaft 118 rotates, a rotational force is transferred to the central linkage arm 117, which is rigidly attached to actuator shaft 118 on one end. This rotational force is further transferred to connecting part 306 and thereby adjusts the length of the flexible manifold runners.

In contrast, FIG. 4 shows a schematic side view diagram of the example I4 engine with braided runners in the short configuration. As such, actuation shaft 118 has been rotated about a longitudinal axis and actuator linkage arms 116 and central linkage arm 117 extend laterally away from actuator shaft 118 as shown in FIG. 2. In this view, because the linkage arms extend laterally away from the actuator shaft, all three arms are shown as small ovals to represent the view looking down the longitudinal axis of the linkage arms. Furthermore, connecting part 306 is shown bisecting actuator shaft 118 to indicate its position has also changed in response to the rotation of the shaft. Therefore, the structure has been rotated as a unit to adjust the length of the braided intake manifold runners.

As described in more detail in FIG. 2, air flow paths through plenum 104 and flexible braided runners in the short configuration are shown in FIG. 4. Advantages of the method include introducing more air into the intake manifold runners for higher power during operating conditions where the engine load and RPMs are high (e.g. greater than 5000 rpms). Therefore, as the air introduced through air intake passage 102 fills plenum 104, at least some of the air is directed to intake manifold runners 106, which flows to intake manifold 108. As indicated above, arrows 304 depict the direction of flow through the intake manifold runners.

Engine 100 includes controller 12, which may adjust the position of actuation shaft 118 based on the speed and load on the engine. Therefore, engine speed signal, RPM, may be generated by engine controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. For example, in some embodiments, the control system may be comprised of a map that relates the speed of the vehicle or RPMs to the volume of air delivered to the intake ports of a combustion chamber. Then, in response to a detected speed and load, controller 12 may direct actuator shaft 118 to rotate its position based on the detected operating conditions. Because the shaft is continuously adjustable within an operating range, modulation of runner length is also continuously variable. Therefore, the tube shape can be designed and calibrated to adjust the length and cross-sectional area such that a known amount of air can be delivered to the engine based on the operating conditions. In this way, the intake manifold runners of an engine can be tuned to deliver air to the intake ports of an engine based on the speed and load on the engine.

The system described includes a method for controlling the volume of air delivered to intake ports of an engine based on the operating conditions therein. Therefore, FIG. 5 shows a flow chart of method 500 that allows the position of the actuator shaft to be adjusted in order to control the flow of air through the variable intake manifold runners.

At box 502, method 500 includes monitoring the engine operating conditions. For example, controller 12 may be a conventional microcomputer including: a microprocessor unit, input/output ports, read-only memory, random access memory, keep alive memory, and a conventional data bus. Although sensors within engine 100 are not shown, controller 12 may receive various signals from sensors coupled to engine 100, including: engine coolant temperature (ECT) from a temperature sensor; a position sensor coupled to an accelerator pedal for sensing force applied by a foot; a measurement of engine manifold pressure (MAP) from a pressure sensor coupled to intake manifold 108; an engine position sensor from a Hall effect sensor sensing crankshaft position; a measurement of air mass entering the engine; and a measurement of throttle position. Barometric pressure may also be sensed for processing by controller 12. In one aspect of the present description, an engine position sensor produces a predetermined number of equally spaced pulses per revolution of the crankshaft from which engine speed (RPM) can be determined.

At box 504, method 500 may determine whether to adjust the length of the intake manifold runners based on the operating conditions of the engine. For example, if a load on an engine is increased in response to a vehicle driving uphill, controller 12 may detect the increased RPMs to determine that the length of the flexible manifold runner tube is to be shortened in order to increase the cross-sectional area and thereby increase the air to fuel ratio and deliver high power RPMs. In response, the volume of air may be adjusted when controller 12, which includes memory with instructions to adjust the flexible intake runner based on the operating conditions, sends a signal to rotate actuator shaft 118, which is indicated at box 506. Therefore, the method includes rotating the shaft based on the engine load to adjust the length and cross-sectional area of the braided runners. However, if controller 12 determines that no adjustment is to be made based on the engine operating conditions, controller 12 may determine that the runner lengths are sufficient for the current operating conditions. In this case, the controller may not make an adjustment but instead continue to operate the vehicle using the current conditions while it monitors sensors within the engine system.

Turning to the shape of the flexible manifold runners, FIGS. 6a and 6b show schematic diagrams of cylindrical and conical braided runners to illustrate the various elements of example helically wound braids.

In FIG. 6a, tube diameter 602 is indicated at one end of the figure. However, because the tube shape is cylindrical, the diameter of the tube shown is substantially constant over the entire length of the tube. Therefore, the diameter near the bottom of the tube is substantially equal to tube diameter 602 and the shape is cylindrical. Although a tube length 604 is also shown, it can be adjusted in the manner already described. In response to an extension of tube length 604, tube diameter 602, and therefore the cross-sectional area decreases. Conversely, a compression of tube length 604 is coupled to an increase in tube diameter 602, and therefore the cross-sectional area. For a cylindrical tube, changes to tube diameter 602 are substantially equal as a function of tube length 604.

In one embodiment, an intake manifold runner may be comprised of two helically wound braids. A first composite spring strand 606 and a second composite spring strand 608 are identified in FIG. 6a. By altering the widths of first composite spring strand 606 and second composite spring strand 608, the length to diameter relationship of the tube can be changed. However, for a cylindrical tube, the width of the composite spring strands along the length of the runner is substantially constant. FIG. 6a includes an inset showing an expanded view of the interwoven surface, wherein first composite spring strand 606 has strands that run in a first direction 610, and second composite spring strand 608 has strands that run in a second direction 612 as the two strands interweave along the longitudinal axis of the cylindrical runner. The relationship between the change of tube length 604 and a change in the cross-sectional area, or tube diameter 602, can be further defined by weave angle 614 of the multi-axial braid.

As illustrated in FIG. 6a, the interwoven braids include the strands positioned at an angle with respect to one another (90 degrees in this example), with the angle varying with the length of the tube. The interwoven braids repeatedly overlap with one another, with one strand laying on top and adjacent to, another strand. This woven structure, on a macro scale, enables the variable length as described herein in that the strands are not affixed or bonded to one another at the face-sharing contact areas.

FIG. 6b shows a schematic diagram of a conical runner whose shape may be defined by including a braid with a variable taper from one end to the other, which results in a variable cross-section along the length of the tube. For example, the width of first composite spring strand 606 and second composite spring strand 608 may vary over the length of the tube to create the conical structure. One possible configuration is shown in FIG. 6b wherein the tube diameter 602 at a first end is different from smaller second diameter 603 at the other end of the tube. Because the tube diameters are different at each end, the tube has a conical shape that is different from the cylindrical shape shown in FIG. 6a. As described above with respect to FIG. 6a, an extension of tube length 604 results in a decrease in second diameter 603 and therefore the cross-sectional area of the tube. Conversely, a compression of tube length 604 is coupled to an increase in second diameter 603 and the cross-sectional area. For a conical tube, changes to second diameter 603 at the bottom of the tube may differ from changes to tube diameter 602 as a function of the tube length 604. Furthermore, the relationship between the change of tube length 604 and a change in the cross-sectional area, or second diameter 603, can be defined by weave angle 614 of the multi-axial braid. By varying the angular relationship of the strands in the braided runner, the change in cross-sectional area relative to the change in runner length can be varied. In addition, by altering the width of the individual braid strands and varying the angle of the braid over the length of the runner, the relative changes in cross-sectional area can be made non-uniform relative to changes in runner length, which allows for tuning of the runner shape and length for various operating conditions. Finally, to allow for packaging constraints, the braided runner can be woven over a form of requisite shape using individual strands with varying widths, which allows a tapered runner over a curved length. In this way, the volume of air delivered to the intake ports of an engine can be calibrated based on the speed and load of an engine.

This concludes the description. The reading of it by those skilled in the art would bring to mind many alterations and modifications without departing from the spirit and the scope of the description. For example, I3, I5, V6, V8, V10, and V12 engines operating in natural gas, gasoline, diesel, or alternative fuel configurations could use the present description to advantage.

The invention claimed is:

1. An engine system, comprising:
an actuator shaft with a linkage arm coupled thereto;
a flexible intake runner coupling an intake manifold of the engine system to an intake port of an engine cylinder, where one end of the flexible intake runner is coupled to the linkage arm, and a length of the flexible intake runner is adjustable via movement of the linkage arm;
wherein the flexible intake runner is comprised of helically wound braids made from strands of a composite material;
wherein the flexible intake runner has a shape that is at least one of cylindrical and conical; and
wherein the flexible intake runner is conical when a composite strand has a variable taper along its length.

2. The engine system of claim 1, wherein a diameter of the flexible intake runner decreases as the length of the flexible intake runner is extended.

3. The engine system of claim 1, wherein a diameter of the flexible intake runner increases as the length of the flexible intake runner is compressed.

4. The engine system of claim 1, wherein the flexible intake runner is cylindrical when the composite strand has a constant width.

5. The engine system of claim 3, wherein the length of the flexible intake runner is continuously variable.

6. The engine system of claim 3, wherein the flexible intake runner is encased in a flexible polymer membrane.

7. The engine system of claim 6, wherein the flexible intake runner is attached to a manifold flange at one end and a ring on a second end.

8. The engine system of claim 4, where changes to a diameter are substantially equal as a function of the length for the cylindrical flexible intake runner.

9. The engine system of claim 7, wherein an assembly comprised of the flexible intake runner and the ring is encased in a plenum.

10. The engine system of claim 1, wherein a relationship between a change in runner length and a change in a cross-sectional area is defined by a weave angle between the helically wound braids.

11. The engine system of claim 1, wherein one end of the flexible intake runner is fixed at an outlet of a manifold plenum, and an opposite end of the flexible intake runner is moveable within the manifold plenum while being spaced away from all inlets and outlets of the manifold plenum.

12. The engine system of claim 11, wherein a width of individual strands of the flexible intake runner and a weave angle allows a change in a cross-sectional area to be non-uniform relative to a change in runner length.

13. The engine system of claim 12, wherein individual braid strands have a variable width to allow the flexible intake runner to be tapered over a curved length.

14. The engine system of claim 13, wherein a curved flexible intake runner is actuated via a rotary actuator with an actuation arm scribing an arc followed by the flexible intake runner.

15. The engine system of claim 14, wherein actuation of the flexible intake runner is continuously variable.

16. An engine system comprising:
an air intake manifold to deliver air to one or more combustion chambers of an engine block,
a flexible intake runner made of helically wound braids whose length is adjustable to change a cross-sectional area of the flexible intake runner, wherein the helically wound braids are made from strands of a composite material, the strands being variable in width to allow the flexible intake runner to be tapered over a curved length,
a controller with memory including instructions to adjust the flexible intake runner by increasing runner length to decrease the cross-sectional area, and
decreasing runner length to increase the cross-sectional area in response to operating conditions.

17. The engine system of claim 16, wherein the flexible intake runner further comprises:
a first end adjustable within a space of an intake manifold and a second end fixed at an engine intake port.

18. The engine system of claim 17, wherein the first end is uncoupled from the intake manifold and an intake manifold opening.

19. The engine system of claim 18, wherein the second end is coupled to the engine intake port through a manifold flange.

20. A method, comprising:
via a controller, adjusting an end position of a flexible intake runner coupled to an air intake manifold to vary runner length and cross-sectional area based on engine operating conditions;
wherein the flexible intake runner comprises helically wound braids made from strands of a composite material, the strands having a variable width to allow the flexible intake runner to be tapered over a curved length.

* * * * *